United States Patent [19]
Wecker, Sr.

[11] 3,849,312
[45] Nov. 19, 1974

[54] FILTER BED ASSEMBLY FOR CLEANSING COOKING OILS AND THE LIKE

[75] Inventor: Walter A. Wecker, Sr., Deerfield, Ill.

[73] Assignee: Wacker-Dearborn Corporation, Chicago, Ill.

[22] Filed: Nov. 6, 1972

[21] Appl. No.: 303,975

[52] U.S. Cl.............. 210/237, 55/357, 55/494, 210/DIG. 8, 210/455, 210/470, 210/250
[51] Int. Cl............................................ B01d 25/14
[58] Field of Search .......... 210/250, 318, 406, 416, 210/489, 167, 232, 237, 455, 238, DIG. 8, 470; 55/494, 357, DIG. 31

[56] References Cited
UNITED STATES PATENTS

| | | | |
|---|---|---|---|
| 1,413,892 | 4/1922 | Bergholz et al..................... | 210/238 |
| 2,172,943 | 9/1939 | Norris........................... | 210/232 UX |
| 2,204,158 | 6/1940 | Serio et al...................... | 210/250 X |
| 2,209,447 | 7/1940 | Dowling......................... | 210/318 X |
| 2,760,641 | 8/1956 | Mies, Jr. et al................. | 210/489 X |
| 3,084,609 | 4/1963 | Onstad.......................... | 55/DIG. 31 |
| 3,400,824 | 9/1968 | Weimer et al................... | 210/DIG. 8 |

OTHER PUBLICATIONS
Publication, Spartiler Mfg. Co., Mundelein, Ill. Bulletin Vp 2M 2-54 (February-1954).

*Primary Examiner*—Theodore A. Granger
*Attorney, Agent, or Firm*—Olson, Trexler, Wolters, Bushnell & Fosse, Ltd.

[57] ABSTRACT

A filter bed assembly comprises a base plate, a filter element and a joining and lifting arrangement. The base plate is adapted to be situated adjacent the floor of a filtration vessel and includes an upright, centrally disposed connection member and a perforate filter plate rigidly affixed to the connection member. The filter element is provided with a central aperture that is sized to admit the connection member of the base plate; and the joining and lifting arrangement includes a frame that is adapted for mechanically securing edge portions of the filter element against a cooperating bowl periphery, a connection element which spans the frame and which is provided with coupling means for releasably engaging the connection member of the base plate, and a handle disposed over the frame.

6 Claims, 8 Drawing Figures

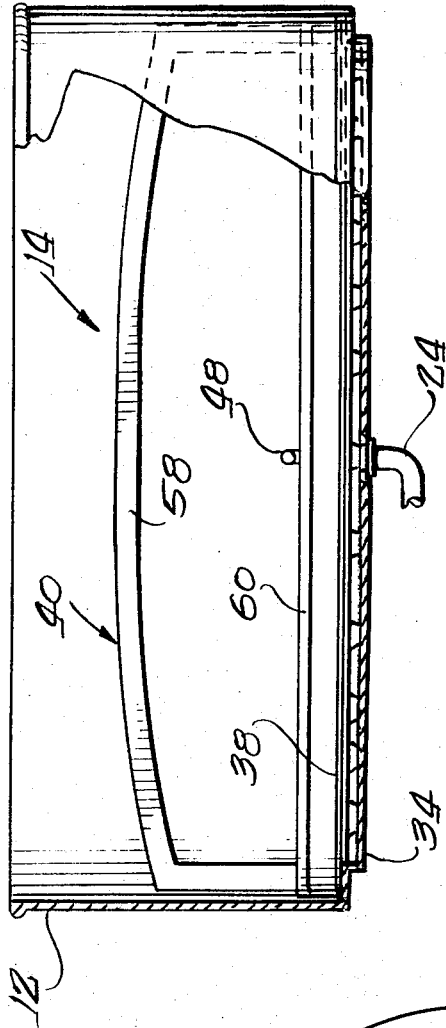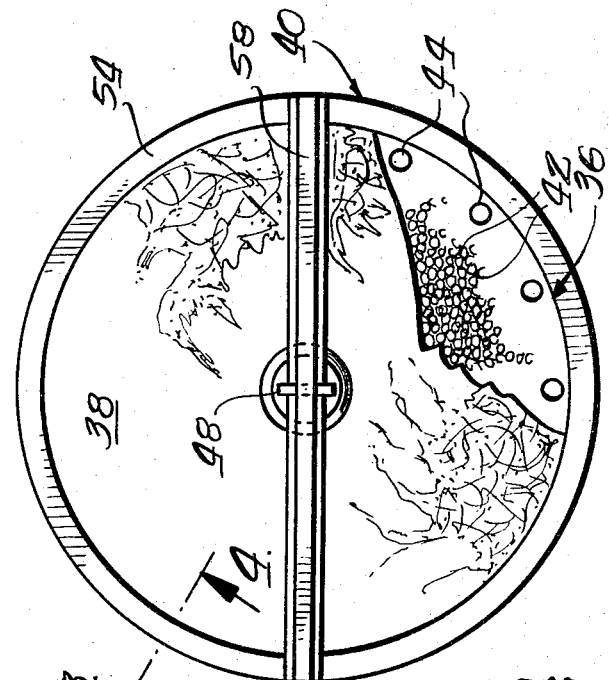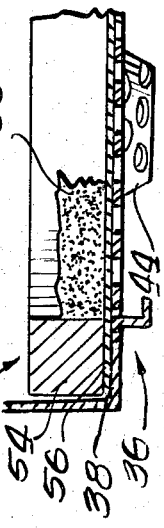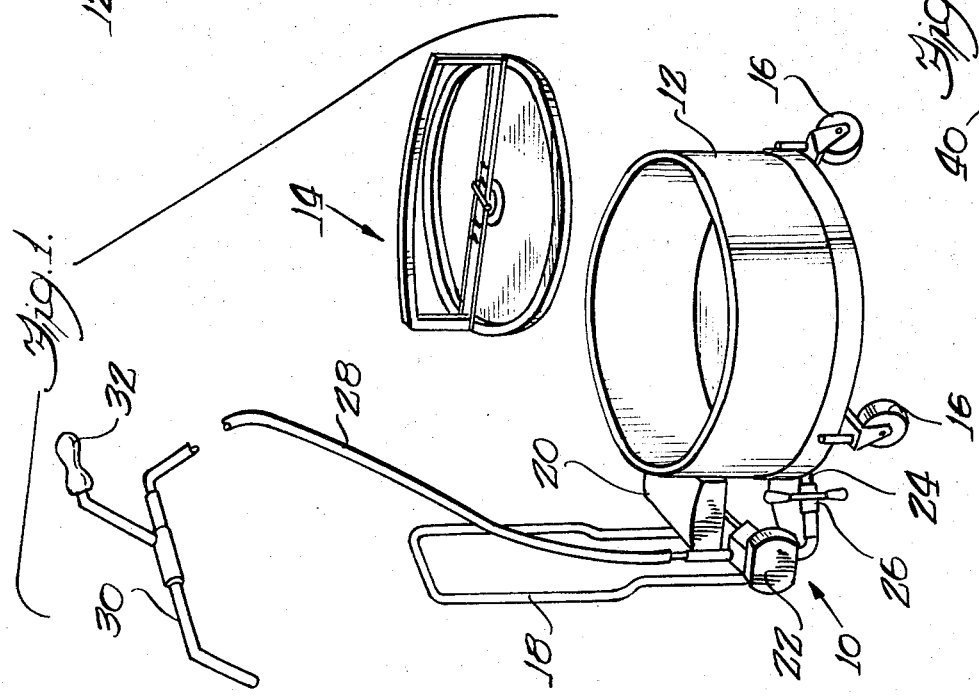

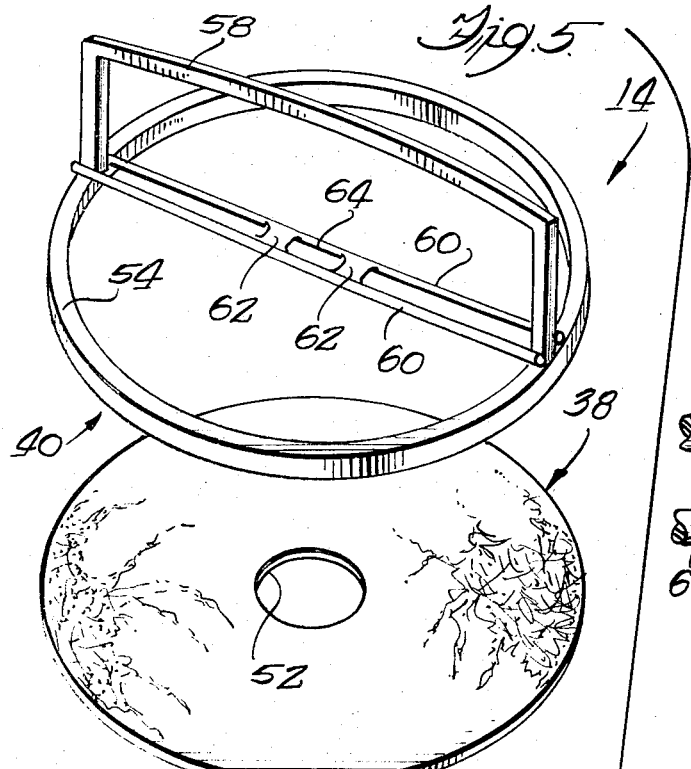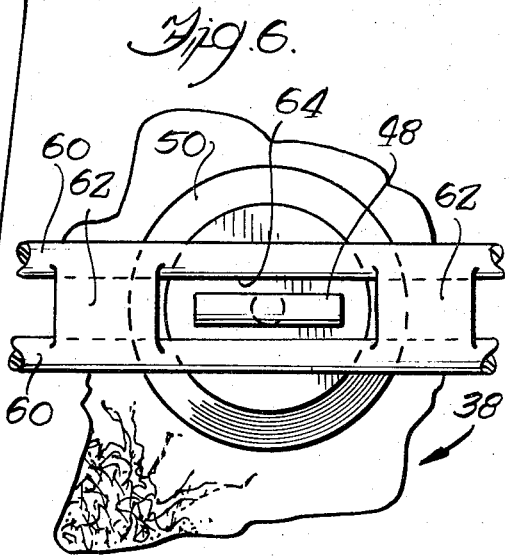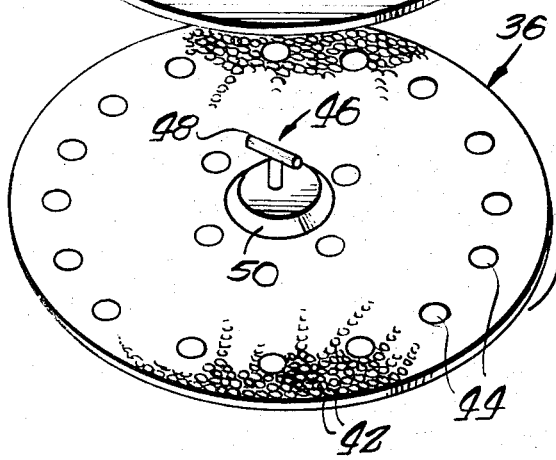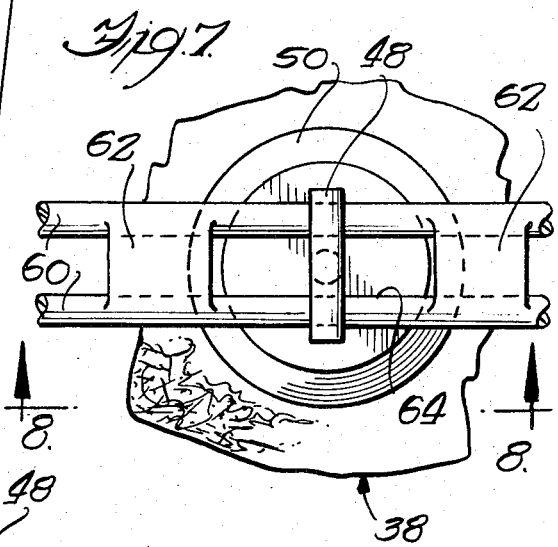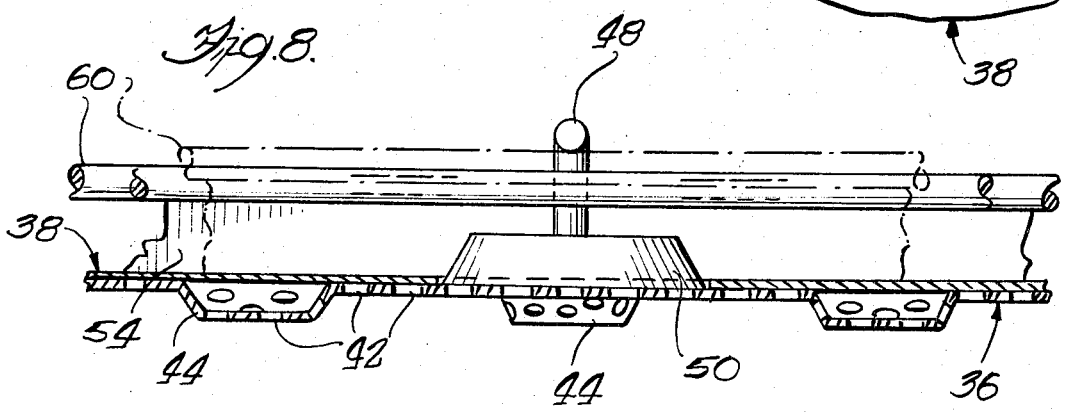

FILTER BED ASSEMBLY FOR CLEANSING COOKING OILS AND THE LIKE

BACKGROUND OF THE INVENTION

This invention relates generally to vacuum filter apparatus and more particularly to filter bed assemblies for use in such apparatus.

Portable, vacuum filtering units have been developed heretofore for cleansing the cooking fats and oils used in commercial deep frying operations; and these units frequently comprise a filter bowl or vessel, a disposable filter bed consisting of filter paper and filter powder, plus a pump unit for drawing the cooking oils through the filter bed. However, problems have arisen in securing the filter bed in proper position and resort has been taken to clamping a filter paper between a screen or perforated metal pan and a retainer ring using a variety of threaded clamps or fitments. It has been found, however, that the progressive engagement of the threaded parts tends to cause wrinkling of the filter paper on installation, thus interfering with the filtering action, and has proved to be tedious and time-consuming. A related problem exists in removing the spent filter bed easily, without spillage of the accumulated debris and without misplacing or losing the separate but inefficient handles or hooks commonly employed for such purpose.

Accordingly, an important object of the present invention is to provide a filter bed assembly which easily and positively positions a filter element and which is of simple construction utilizing a minimum number of parts.

A more general object of the invention is to provide a new and improved filter bed assembly for advantageous use in portable, vacuum filtering units for cleansing cooking oils and the like.

Another object of the invention is to provide a filter bed assembly which includes a combined lifting handle and connection guide.

These and other objects and features of the invention will become more apparent from a consideration of the following descriptions.

BRIEF DESCRIPTION OF THE DRAWINGS

The invention, both as to its construction and its mode of use, will be better understood by the reference to the following disclosure and drawings forming a part thereof, wherein:

FIG. 1 is a perspective view of a portable vacuum filtering unit and a filter bed assembly constructed in compliance with the principles of the present invention;

FIG. 2 is an enlarged, side-elevational view of the filtering vessel of the unit of FIG. 1 shown with the wall of the vessel partially broken away to illustrate mounting of the filter bed assembly therein;

FIG. 3 is a top plan view of the filter bed assembly;

FIG. 4 is an enlarged, cross-sectional view taken substantially along the line 4—4 of FIG. 3 and illustrating assembly of the paper filter element;

FIG. 5 is an exploded perspective view of the filter bed assembly of FIG. 1;

FIG. 6 is an enlarged, fragmentary, plan view showing alignment of the connection and coupling portions of the base plate and the clamping and lifting arrangement;

FIG. 7 is a view similar to the showing of FIG. 6 but illustrating the parts in the assembled condition; and FIG. 8 is a view taken in elevation along the line 8—8 of FIG. 7.

DESCRIPTION OF THE DISCLOSED EMBODIMENT

Referring now in detail to the drawings, specifically to FIG. 1, a vacuum filtering unit indicated generally by the reference numeral 10 includes a generally cylindrical filter bowl or vessel 12 which is intended to receive a filter bed assembly 14 in compliance with the present invention. In order that the unit 10 may be readily portable, the bowl 12 is mounted on a suitable number of casters 16 and an inverted U-shaped handle 18 is connected to the bowl 12 by means including a housing 20. Suction for filtration is achieved by means of a pump 22 which is fastened to the housing 20 and which is connected to the bottom of the bowl 12 by means including a piping arrangement 24 and a coupling 26. A flexible hose 28 is connected to the outlet of pump 22, and the otherwise free end of the hose 28 is fitted to a nozzle 30. For facility in manipulation of nozzle 30, there is provided an offset, thermally non-conducting handle 32. As is shown in FIG. 2, the filter bed assembly 14 fits inside the bowl 12 and rests directly on a floor panel 34 of the bowl.

Turning to a consideration of FIG. 5 for a more detailed description of the filter bed assembly 14, that arrangement comprises a base plate 36, a filter element 38 and a joining and lifting unit 40. The base plate 36 is advantageously fabricated from a metal sheet having numerous perforations 42 therein, and the plate 36 is provided with a series of depending projections or blisters 44 which serve to space the base plate 36 generally above the floor of vessel 12, as is shown in FIG. 2, in order to distribute the suction force evenly over the surface of the base plate. Returning to consideration of FIG. 5, the base plate 36 includes an upright, centrally disposed connection member 46 comprised of a tee-bar 48 which is rigidly affixed by means including a frustoconical platform 50, the tee-bar 48 serving as a mounting site for the joining and lifting arrangement in a manner to be described hereinafter.

The filter element 38 is fabricated from a suitable material such as filter cloth or paper; and the element 38 is perforated with a central aperture 52 which is sized to fit over the connection member 46, as is best seen in FIG. 8, the tapering sides of the platform 50 cooperating with the edges of the aperture 52 in leading the filter element 38 into proper assembled condition with the base plate 36. In addition, the filter element 38 is selected to have a size and shape generally larger than that of the base plate 36 so that the filter element will extend a distance beyond the edges of the base plate so as to be in direct contact with a peripheral surface of the receiving bowl 12 as is best seen in FIG. 2.

Continuing with reference to FIG. 5, the joining and lifting arrangement includes a circular clamping frame or ring 54 which has a flat lower surface 56, best seen in FIG. 4, for mechanically securing edge portions of the filter element 38 directly against the upper edge surface of the bottom of bowl 12. Returning to FIG. 5, the joining and lifting arrangement 40 also includes an upstanding yoke or handle 58 which spans the ring 54 diametrically. In addition, a pair of parallel, laterally spaced rods 60 extend diametrically across the ring 54; and a pair of transverse webs 62 join the rods 60 into a connection member and define a slot 64. As is best seen in FIG. 6, the slot 64 is sized to pass the crossarm of tee-bar 48 when the crossarm is aligned parallel with the rods 60. Furthermore, the rods 60 are laterally spaced by a distance less than the length of the crossarm so that, when the tee-bar is passed through the slot 64 and the joining and lifting arrangement is rotated 90°, the crossarm will be captured above the rods 60. The upright of the tee-bar 48 is selected to have a length such that the crossarm is spaced apart from the rods 60 at normal room temperatures, as is shown in solid outline in FIG. 8, whereby to accommodate thermal expansion of the parts when the filter assembly 14 is immersed in hot cooking oil, as is suggested in broken outline in FIG. 8. In accordance with the features of the present invention, the handle 58 is aligned generally in a vertical plane over the rods 60 so that the attitude of the slot 64 may be visually determined by examining the attitude of the handle 58.

Having thus described one construction of the invention, it is important now to state how the illustrated embodiment operates. When it is desired to cleanse the cooking oil or fat charged into a commercial deep fryer, for example, the filter unit 10 will be readied for operation and wheeled to the fryer with the bowl 12 disposed beneath the fryer drain. To ready the vacuum filtering unit, the base plate 36 of the filter bed assembly 14 will be placed in the bottom of the bowl 12 within the stepped-down central portion thereof, as is shown in FIG. 2. Next, the filter element 38 will be placed over the base plate 36 and over the peripheral edge of the bowl, the aperture 52 passing the tee-bar 48 and the tapering sides of the platform 50 positioning the filter element in proper location. Thereafter, the handle 58 will be grasped and the joining and lifting arrangement 40 will be rotated to align the slot 64 with the crossarm of the tee-bar. The joining and lifting arrangement will then be rotated 90°. A suitable quantity of filter aid or powder will then be poured over the surface of the filter element 38 and preferably over the ring 54.

The fryer drain will then be opened and the heated fat allowed to flow into the filter bowl 12, the pump 22 being energized to provide suction and draw the oil through the filter powder and the filter element 38 for cleansing, the ring 54 sealing the filter element 38 at the edge of the bowl 12. After the heated fat has been purified and returned to the fryer, the pumping action will be continued until the filter bed is dry and the stream from the nozzle 30 has stopped completely. The assembly 14 will then be removed as a unit along with the accumulated debris and spent filter media. It will be appreciated that handling the assembly 14 as a unit affords substantial convenience, and the mimimum number of parts involved reduces the possibility of misplaced components. It will be appreciated that fabricating the platform 50 to be imperforate aids in uniformly distributing the suction force when the suction drain is aligned centrally of the bowl 12.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A filter bed assembly comprising: base plate means adapted to be disposed adjacent the floor of a filtration vessel and including an upright, centrally disposed connection member and a perforate filter plate rigidly affixed to said connection member; a filter element having a central aperture sized to admit said connection member therethrough; joining and lifting means including a frame arranged for mechanically securing edge portions of said filter element in sealing position adjacent said filter plate, a connection element spanning said frame at the central portion thereof with opposite end portions of said connection element connected to the peripheral edge of said frame whereby clamping pressure applied to the central region of said connection element is transmitted to the opposite ends thereof where connected to said frame, said connection element further having coupling means for releasably engaging said connection member, and handle means upstanding from said frame, said filter element being situatable between said base plate and said frame and one of said connection member and said coupling means including transverse arm means and the other of said connection member and said coupling means including aperture means sized to pass said transverse arm means in one position of relative rotation for assembly and disassembly and to capture said transverse arm means in a different position of relative rotation for manipulating the filter bed assembly.

2. A filter bed assembly according to claim 1 wherein said connection member includes a post and a crossarm on said post and wherein said coupling means includes a slot shaped to pass said crossarm in one position of relative rotation and to couple said crossarm in a different position of relative rotation.

3. A filter bed assembly according to claim 1 wherein said handle means is aligned with said frame whereby to provide means for visually locating the rotational attitude of said frame beneath a charge of filter powder.

4. A filter bed assembly according to claim 1 wherein said filter element is filter paper.

5. A filter bed assembly according to claim 1 wherein said connection member includes means coacting with said central aperture to locate said filter element with respect to said base plate means.

6. A filter unit comprising: a bowl having a stepped-down central portion and a peripheral edge raised above the floor of said central portion; base plate means adapted to be disposed within said central portion and having an upper surface coplanar with the upper surface of said peripheral edge, said base plate means including an upright, centrally disposed connection member and a perforate filter plate rigidly affixed to said connection member; a filter element having a central aperture sized to admit said connection member therethrough; joining and lifting means including a frame arranged for mechanically securing edge portions of said filter element in sealing position adjacent said filter plate and relative to said peripheral edge, a connection element spanning said frame at the central portion thereof with opposite end portions of said connection element connected to the peripheral edge of said frame whereby clamping pressure applied to the central region of said connection element is transmitted to the opposite ends thereof where connected to said frame, said connection element further having coupling means for releasably engaging said connection member, and handle means upstanding from said frame, said filter element being situatable between said base plate and said frame and one of said connection member and said coupling means including transverse arm means and the other of said connection member and said coupling means including aperture means sized to pass said transverse arm means in one position of relative rotation for assembly and disassembly and to capture said transverse arm means in a different position of relative rotation for manipulating the filter bed assembly.

* * * * *